US00RE34143E

United States Patent [19]

Rao et al.

[11] E Patent Number: Re. 34,143

[45] Reissued Date of Patent: Dec. 15, 1992

[54] OILLESS INTERNAL COMBUSTION ENGINE HAVING GAS PHASE LUBRICATION

[75] Inventors: Vemulapalli D. N. Rao, Bloomfield Township, Oakland County; Wallace R. Wade, Farmington Hills, both of Mich.

[73] Assignee: Ford Motor Company, Dearborn, Mich.

[21] Appl. No.: 756,258

[22] Filed: Sep. 6, 1991

Related U.S. Patent Documents

Reissue of:

[64] Patent No.: 4,872,432
Issued: Oct. 10, 1989
Appl. No.: 159,615
Filed: Feb. 23, 1988

[51] Int. Cl.[5] ..... F02F 23/00

[52] U.S. Cl. ..... 123/193.4; 123/193.2; 51/319

[58] Field of Search ..... 123/193 P, 193 CP, 193 C; 51/319; 92/155, 153

[56] References Cited

U.S. PATENT DOCUMENTS 3,890,950 6/1975 Haldeman ..... 123/193.4

FOREIGN PATENT DOCUMENTS 2050882 1/1981 United Kingdom ..... 51/319

OTHER PUBLICATIONS

"A Low Friction, Unlubricated Silicon Carbide Diesel Engine", SAE paper No. 830313, by Timoney et al.

*Primary Examiner*—E. Rollins Cross
*Assistant Examiner*—M. Macy
*Attorney, Agent, or Firm*—Joseph W. Malleck; Roger L. May

[57] ABSTRACT

An oilless engine having a piston reciprocal within a cylinder and along an axis of such cylinder while providing an annular gap therebetween to receive combustion gases and a gas phase blow-by control system for such engine. The system comprises (a) an annular receptacle in at least one of said piston and cylinder; (b) an annular body of graphite carrying high temperature solid lubricant disposed in said annular receptacle, said body presenting a face projecting out of said receptacle: (c) an elastomer material retentive of elasticity at the maximum operating temperature to be experienced by said body, interposed between said body and receptacle to urge said body to close said gap under all operating conditions of said engine; and (d) axially directed grooves in said body face sized to substantially trap cylinders of combustion gases therein by viscosity under low pressure gradients and to limit the passage of a combustion gases through said grooves under high pressure gradients to one percent or less of the cylinder gas charge volume, the gas cylinders functioning as bearings to ride the piston during reciprocation.

20 Claims, 12 Drawing Sheets

OILLESS INTERNAL COMBUSTION ENGINE HAVING GAS PHASE LUBRICATION

Matter enclosed in heavy brackets [ ] appears in the original patent but forms no part of this reissue specification; matter printed in italics indicates the additions made by reissue.

BACKGROUND OF THE INVENTION

1. Technical Field

This invention relates to the art of engine lubrication and, more particularly, to oil-less lubrication for the piston-cylinder chamber.

2. Description of the Prior Art

A low heat rejection engine, particularly for a diesel engine, has the potential to provide significant improvement in fuel economy. Heat rejection can be reduced by eliminating liquid cooling normally incorporated in the block of a diesel engine and replacing all or a portion of the combustion chamber components with materials that can operate at uncooled combustion temperatures, such as ceramics. This is sometimes referred to as an adiabatic diesel engine.

The temperature gradient in such low heat rejection engine will range up to 1600° F. (871° C.). At such temperatures, conventional oil, used as a piston lubricant, will pyrolyze. Therefore, some means must be provided to create an antifriction relationship between the cylinder wall and piston which is devoid of fossil lubricants.

One approach, suggested in 1983 by S. Timoney and G. Flynn in an article entitled "A Low Friction, Unlubricated Silicon Carbide Diesel Engine", SAE Paper #830313, was to install a close-fitting SiC piston in a SiC cylinder, the piston having no ring grooves. Blowing of gases past the pistons could not be detected; the authors concluded that the piston must be riding on a gas film due to the reduction in friction horsepower. However, much of their test work was carried out without the engine firing, so a pressurized gas film was not the total reason for nonscuffing but was also due to the low interfacial friction of SiC on SiC. The structure of the Timoney and Flynn piston and cylinder had made no accommodation for thermal growth and assumed uniform dimensions; oil lubrication was fed to the piston pin area which assured little dimensional change and, in fact, contributed to oil lubrication notwithstanding the authors' label of an unlubricated engine. This reference merely defined the problem without providing a specific solution as how to provide a reliable gas phase lubrication while encountering thermal growth, wide variations in the fit, and without oil lubrication. This reference did suggest that if clearances could somehow be controlled, a gas film would function to lubricate the sliding piston in such cylinder.

Thus, it is an object of this invention to be able to control the dimensional clearances between the piston and cylinder of an internal combustion engine, which uncontrolled clearances may be wide-ranging due to thermal variations of the materials used for the piston and cylinder and mechanical variations resulting from connecting rod loads.

It is also an object to move gas phase lubrication theory from the experimental laboratory stage into the commercial environment involving imperfect dimensional clearances.

Still another object of this invention is to provide an oilless uncooled internal combustion engine that has improved gap control and reduced friction with considerably reduced gas blow-by.

SUMMARY OF THE INVENTION

The invention is a gas phase lubrication system which operates effectively within an oilless engine. Such engine has a piston reciprocal within a cylinder and along an axis of such cylinder while providing an annular gap therebetween to receive combustion gas. Such gas phase lubrication system comprises: (a) an annular receptacle in at least one of the piston and cylinder; (b) an annular body of graphite carrying high temperature solid lubricant disposed in such receptacle, the body presenting a face projecting beyond the receptacle; (c) an elastomer material, retentive of elasticity at the maximum operating temperature to be experienced by the body, interposed between the body and receptacle to urge the body to close the gap under substantially all operating conditions of the engine; and (d) axially directed grooves in the body face sized to substantially trap cylinders of combustion gases therein by viscosity under low pressure gradients and to limit the passage of the combustion gases through such grooves or from such trapped gas cylinders under high pressure gradients to one percent or less of the cylinder gas charge volume, said gas cylinders functioning as bearings to ride the piston during reciprocation.

The receptacles for receiving the annular solid lubricant may be (i) restricted to the lower region of the piston side wall as a shallow ring, which region will oppose the cylinder wall and experience a maximum operating temperature of 550° F., (ii) receptacles in the piston side wall extending substantially upward from adjacent the bottom of the piston to above the piston pin, as a sleeve, which region will oppose the cylinder wall having a maximum operating temperature of up to 800° F., (iii) shallow annular ring receptacles separated at two locations, one adjacent the top and one adjacent the bottom of the piston side wall, (iv) reversed in position from any of the above by positioning the receptacles in the cylinder wall rather than the piston side wall, and (v) include the addition of similar receptacles as in (i)-(iii) to the cylinder wall thereby providing complementary receptacles in both the cylinder wall and piston side wall.

The chemistry for the elastomer and solid lubricant may be varied depending upon the maximum operating temperature to be experienced, and a coating of solid film lubricant with a reduced coefficient of friction may be disposed on the opposing cylinder wall or piston wall not containing the first receptacle.

The grooves are sized (cross-section) to insure gas therewithin under low gradients as well as under high pressure gradients. Such grooves preferably have a radial depth of 0.003–0.005 inches and preferably are semicylindrical so that the width of such grooves will be in the range of 0.006–0.01 inches. Advantageously, the alignment of the grooves will make an angle with the cylinder axis of 2–5% to facilitate rotation of the trapped gas phase cylinder as the piston reciprocates.

DETAILED DESCRIPTION AND BEST MODE

Figure 1:
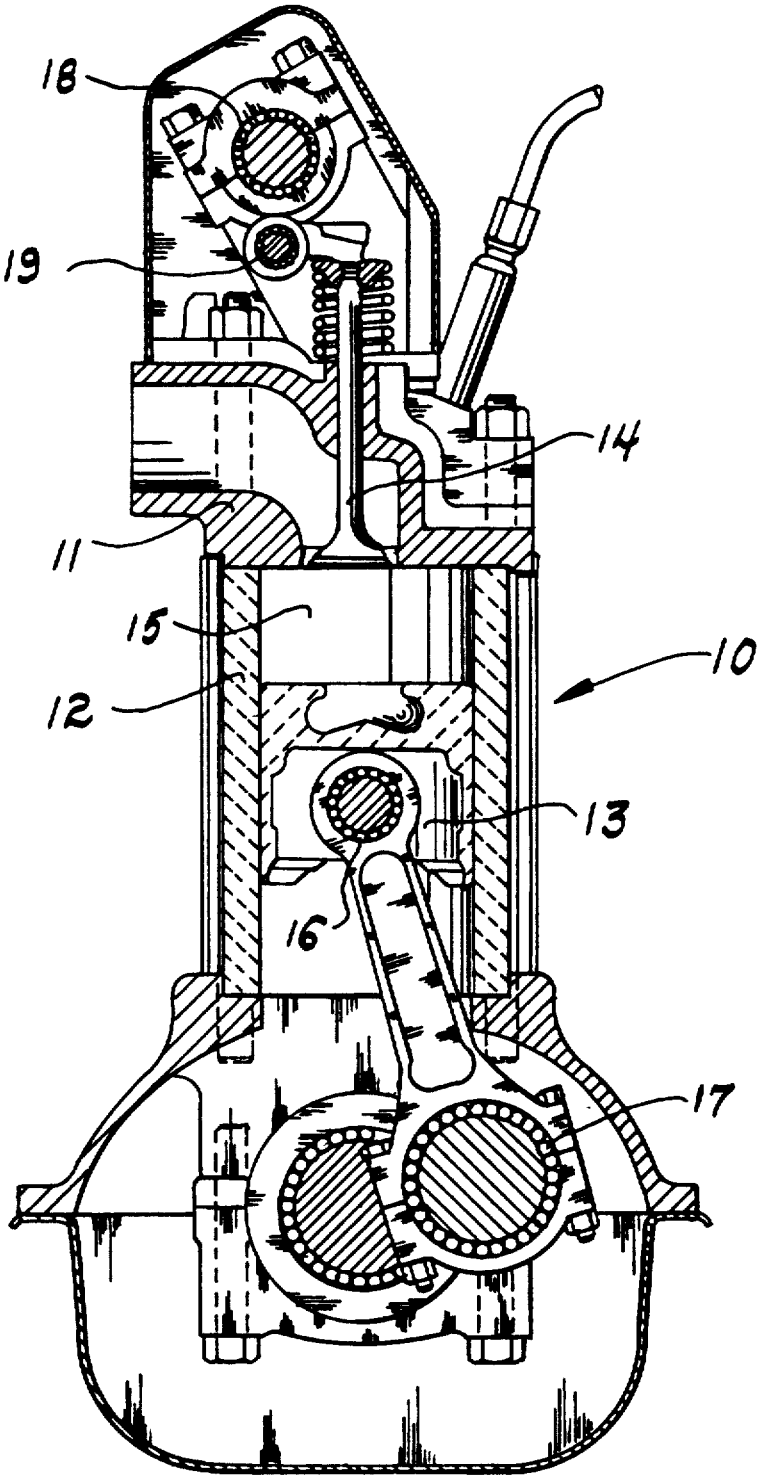
FIG. 1 is a partially sectional and partially schematic view of a four-stroke uncooled oilless engine within which the invention herein is incorporated.

An uncooled oilless four-stroke engine 10 is shown in FIG. 1, having solid structural ceramic components (head 11, cylinder walls 12, piston 13 and valves 14) in the vicinity of the combustion chamber 15; metal components are eliminated in the high temperature areas of the engine. Uncooled is used herein to mean an engine that is devoid of conventional cooling such as a water jacket or fins for air cooling. The resulting higher operating temperatures can be projected to provide at least a 9% improvement in the indicated specific fuel consumption relative to a water cooled, base line engine at part load operating conditions (i.e., 1200 rpm at 38 psi BMEP). Since conventional oil lubrication cannot be used at the higher operating temperatures because such oils will pyrolyze, gas phase lubrication is used. Oil is also eliminated in the crankcase; without crankcase oil, a sealing system to separate the oil from the hot upper cylinder area, where coking can occur, is not required. Oilless ceramic roller bearings 17 and 16 for the crankshaft and connecting rod respectively eliminate this need for oil in the crankcase. With ceramic roller bearings for the valve train finger followers and camshaft (19 and 18), as well as suitable dry lubrication, the engine is further simplified eliminating the need for oil, the oil pump, oil filter and oil gallery drilling. Thus, oilless is used herein to mean devoid of conventional piston rings between the piston and cylinder wall that are designed to ride on a fluid film.

Sintered silicon nitride was used as the material for the structural cylinder wall and piston. Sintered silicon nitride has coefficient of thermal expansion of about $3.6\times10^{6}$/°C., a modulus of rupture of about 85 ksi which is stable up through the temperature range of 1600° F. and has a thermal conductivity which is about 50% of the value of cast iron. However, this invention provides a gas phase lubrication control for any material of which the piston and cylinder wall may be constructed. This comprises cooled engines as well as uncooled engines; it is to be recognized that the benefits of this invention will accrue to a greater degree with an uncooled engine.

Figure 2B:
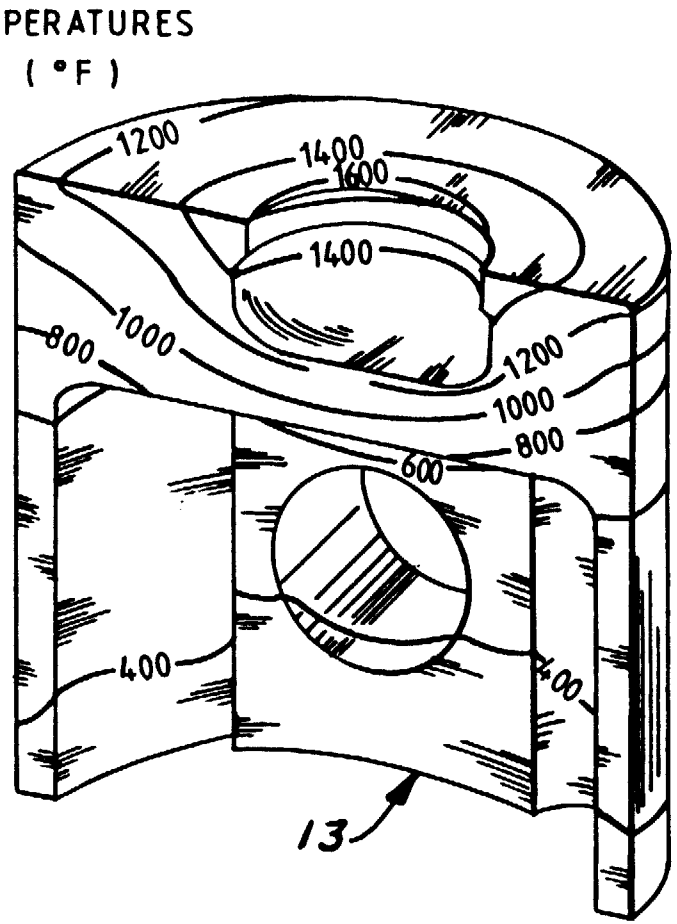
FIG. 2 is a thermal gradient map superimposed on each of the piston and cylinder wall.
Figure 2A:
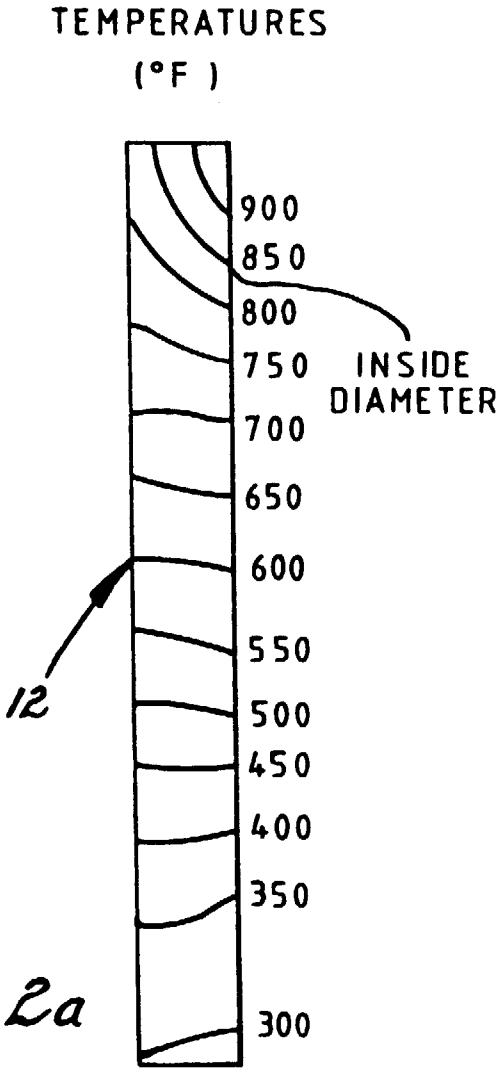

Finite element analysis was used to calculate the maximum operating temperatures and thereby the stresses that would occur in the ceramic cylinder wall 12 and piston 13. The results were used to provide a thermal map shown in FIGS. 2 and 3 for the cylinder wall and for the piston respectively.

Gas phase lubrication between a piston and cylinder wall is dependent on maintaining a tight clearance or annular gap effective in triggering viscous drag to hold a gas phase film therein. Unfortunately, it is very difficult to achieve and maintain a tight and uniform annular gap throughout all aspects of engine operation. The gas phase changes in viscosity and pressure during each of the strokes of the engine operation, and concentricity of the piston within the cylinder bore changes due to major and minor mechanical side thrust loads of the connecting rod which is articulating from side to side. Moreover, there is considerable thermal growth of some regions of the piston (i.e., crown) and side wall (upper region) due to combustion temperatures, which change the gap fundamentally from cold to hot.

Embodiment One

Figure 3:
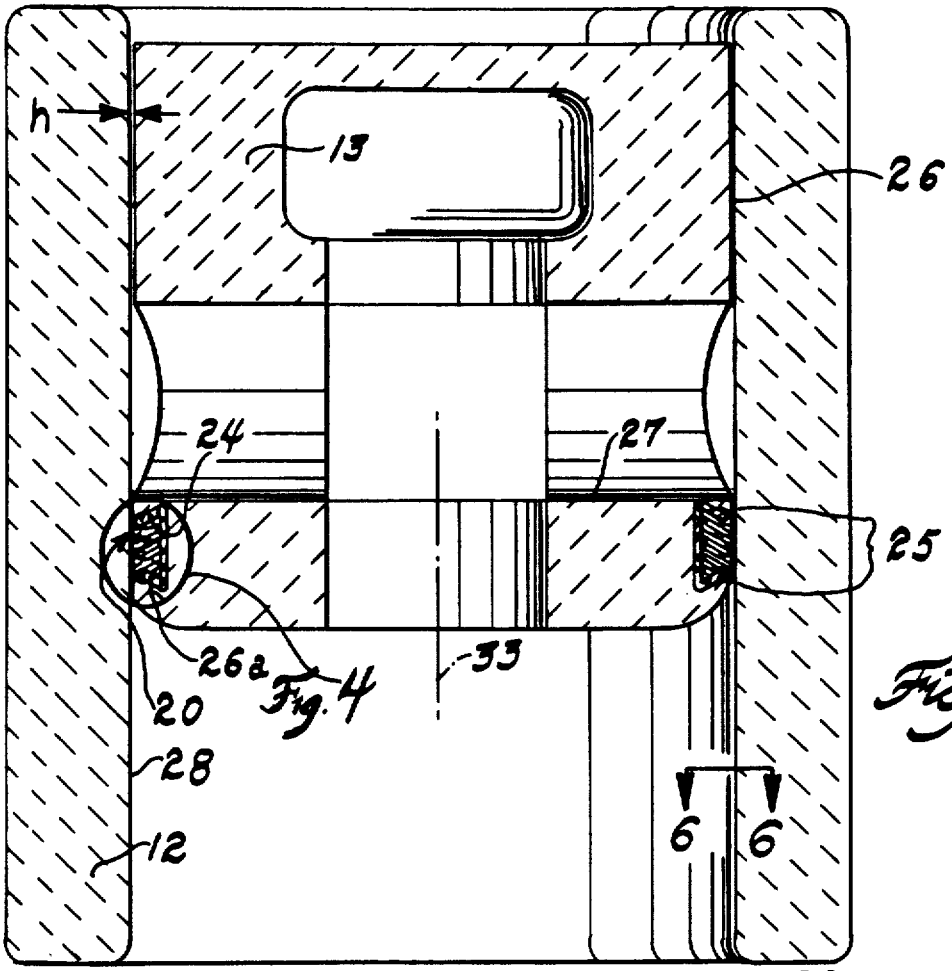
FIG. 3 is an enlarged central sectional view of a piston and cylinder assembly presenting a first embodiment of this invention using a gas phase control restricted to the lower region of the piston side wall.
Figure 6:
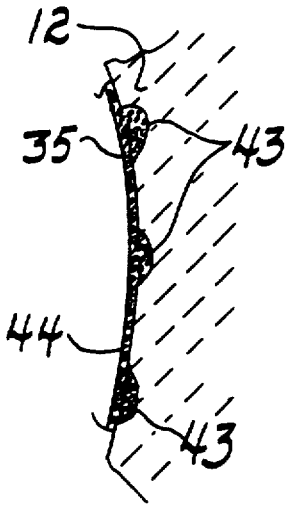
FIG. 6 is an enlarged sectional view taken along line 6—6 of FIG. 1.
Figure 4:
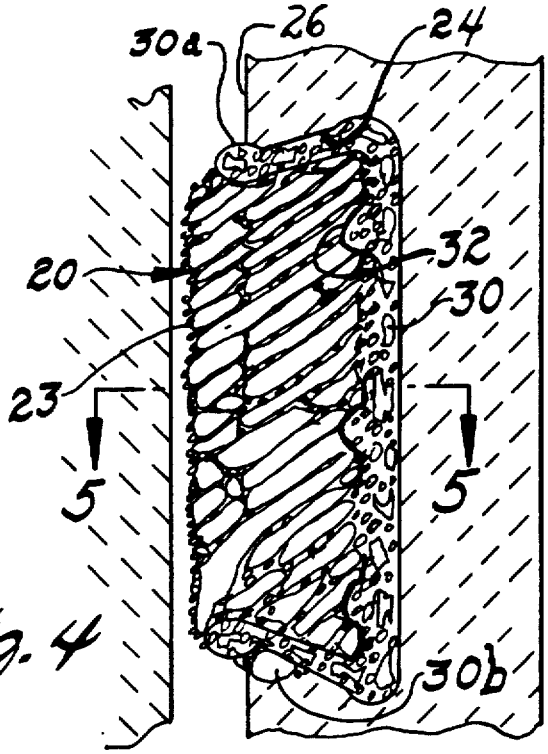
FIG. 4 is an enlarged view of a portion of FIG. 3.
Figure 5:
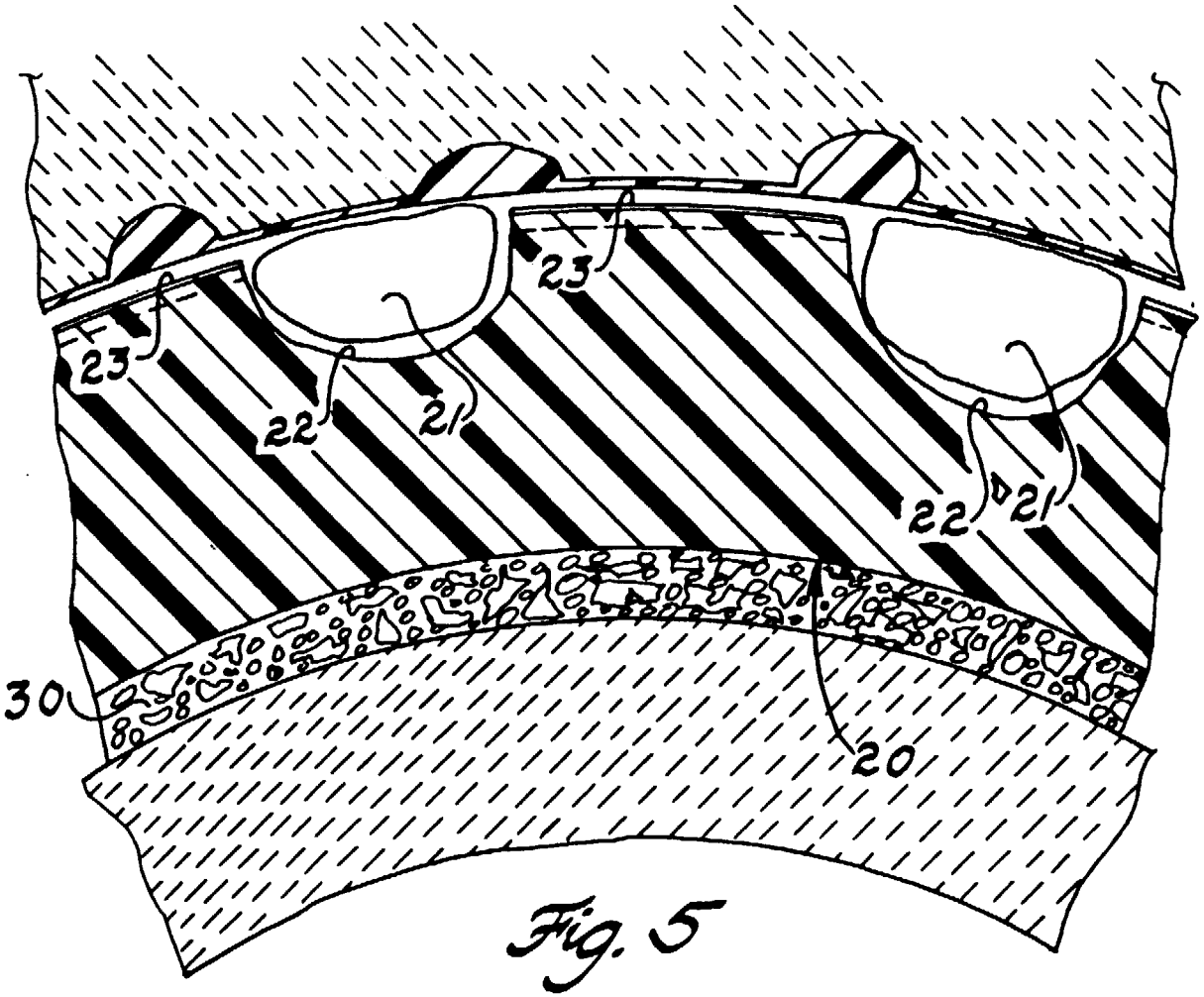
FIG. 5 is an enlarged sectional view taken substantially along line 5—5 of FIG. 4.

FIGS. 3-8 illustrate a first embodiment of a gas phase blow-by control useful in an oilless engine. This invention recognizes that it is very difficult to design a consistently tight gap h between the piston 13 and cylinder wall 12 under all operating conditions. Instead, this invention closes the available annular gap h by use of an antifriction annular body 20 that is radially biased. As shown in FIG. 5, gas phase cylinders 21 are trapped in grooves 22 in the face 23 of such body 20 to act as bearings during reciprocation of the piston 13.

As shown in FIG. 3, this embodiment restricts the receptacle 24 for receiving the annular gap closing body 20 to the lower region 25 of the piston side wall 26, which region 25 will oppose the cylinder wall to experience a maximum operating temperature of about 550° F. The region 25 preferably extends from adjacent the bottom 26a of piston side wall to below but adjacent the piston pin opening 27. The annular receptacle or groove 22 may be dovetailed or under-cut in cross-sectional configuration to facilitate holding the annular body 20 therein. The undercut may form a negative angle of 5°-15° with the cylinder wall surface 26.

The depth or radial extent of such receptacle is in the range of 2 mm to half the thickness of the piston wall, and may have an axial extent 25 which is in the range of 5-15 mm if used at only the bottom of the piston and 15-30 mm if used to hold a sleeve as in another embodiment.

The body 20 is comprised of a graphite carrying, high temperature solid lubricant. A high temperature solid lubricant is used herein to mean a solid lubricant that has a coefficient of friction of 0.02-0.1 at 600° F. The body presents a face 23 which projects out of the receptacle 24 to tend to engage the opposed cylinder wall surface 28. Such solid lubricant is preferably a composite, by volume, of 40% graphite, 20% $MoS_2$, and the remainder a thermally stable (does not decompose up to 375° C. or 700° F.) polymer such as polyarylsulfone; the solid lubricant may also be a metal matrix composite having about 40% graphite and the remainder aluminum or cast iron. Such metal matrix composites may be formed by power metallurgy or other suitable means to provide a porous material that can expose graphite for intermittent or supplementary lubrication purposes. Up to 13% of the graphite may be substituted with boron nitride. The solid lubricant may also include up to 10% copper and one of LiF, NaF and CaF, as a substitute for the $MoS_2$.

An elastomer material 30 is interposed between the body 20 and the receptacle or groove 24 to urge the body face 23 to close the gap h under all operating conditions of the engine. The cross-sectional configuration of the elastomer material may be similar to the shell of an automotive rubber tire which is U-shaped with curved lips 30a at the exposed extremity thereof.

The elastomer material 30 must be effective to retain its elasticity up to a maximum operating temperature of about 550° F. Materials that are useful for this purpose may comprise silanes, such as Dow Corning Resin #95-077GA or Cilastic GA. The resins are compounded with glass fibers (such as Owens Corning #497 Fiber). The fibers are chopped to a short length (such as ¼ inch) and coated with Dow Corning Primer Q36-061 diluted in trichloroethylene and dried for about 10 hours. The coated fibers are then mixed with the silane resin as well as with zinc oxide and some carbon black. The mixture is blended with a catalyst for about 15 minutes and then degassed for ¾ to 1 hour and formed as an extruded material, preferably in the tire shell shape.

Horizontal annular grooves 32 may be defined in the back of the body 20 to provide areas where the elastomer material 30 may interlock with the body and provide a firmer mating therebetween. Such horizontal annular grooves may have a depth of about 0.003–0.005 inches such as shown in FIG. 4.

With the annular body 20 urged by the elastomer material 30 to close gap h, axially directed grooves 22 are defined in the outer face 23 of the body to trap gas phase cylinders 21 therein by viscosity when the grooves are under a low pressure gradient, and to limit passage of combustion gases through the grooves or from such gas cylinders under high pressure gradients to 1% or less of the cylinder gas flow charge volume. The gas cylinders function as rotating bearings to ride the piston during reciprocation. Low pressure gradient is used to mean a gradient of 4500 psi or less, and high pressure gradient is used herein to mean a gradient from 400 psi up to 1700–2000 psi. Grooves 22 are directed axially, but preferably deviate from perfect parallelism with piston or cylinder axis 33 by an angle of 2°–15°. It is desirable that the grooves overlap along a line-of-sight (looking along the surface of the piston parallel to its axis) due to the skewing and thus roll over the full interfacing surface of the cylinder wall. Such slight skewing facilitates the rolling of the gas phase cylinders 21 by viscous drag of the cylinder wall during piston reciprocation.

The axially directed grooves 22 may have a depth of about 0.003–0.01 inches and are spaced apart a distance of about 3 mm; the total semiconductor cross-sectional volume of all the grooves should together provide the predetermined blow-by under a high pressure gradient that is limited to 1% or less of the gas charge volume.

In the case of an annular body which is limited to the bottom lower extent of the piston side wall or skirt, as shown in FIG. 3, the annular body will not be exposed to temperatures in excess of 550° F. during its normal operation in a four cycle engine. Therefore, the elastomer and body should maintain a closure tendency across the gap, and the graphite contained in type body and the rotating gas cylinders in the grooves 22 will provide sufficient antifriction lubrication therebetween. However, to further decrease the friction between the annular body face and the opposing cylinder wall, a solid film lubricant coating 35 (see FIG. 7) containing either BN or $MoS_2$ with graphite may be applied to the cylinder wall.

The coating is comprised of about 40% by weight of high temperature thermoplastic resin such as polyarylsulfone, 40% graphite, and 20% of either $MoS_2$ or BN. A resin that is thermally stable up to about 700° F. is polymer 360, known as Astrel, manufactured by Minnesota Mining and Manufacturing Company. Such resin may be dissolved in dimethyl acetamide to make a syrupy paste to facilitate blending of other ingredients. After the cylinder wall surface is thoroughly cleaned to remove any oxidation, such wall may be grit blasted to increase porosity and thereby the reception of the coating. The blended mixture is spread over the cleansed and porous surface and dried at about 250°–300° F. for at least 15 minutes.

Figure 7:
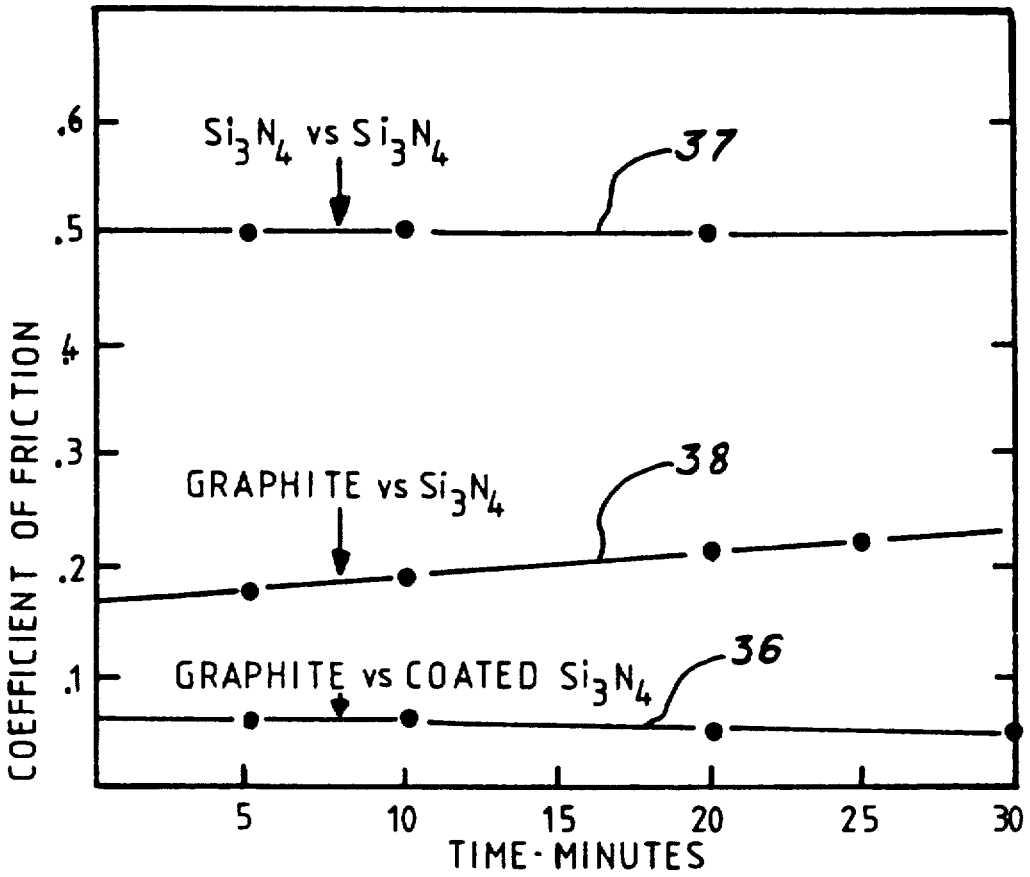
FIG. 7 is a graphical illustration plotting the coefficient of friction with time for various matched materials useful in an adiabatic engine.
Figure 8:
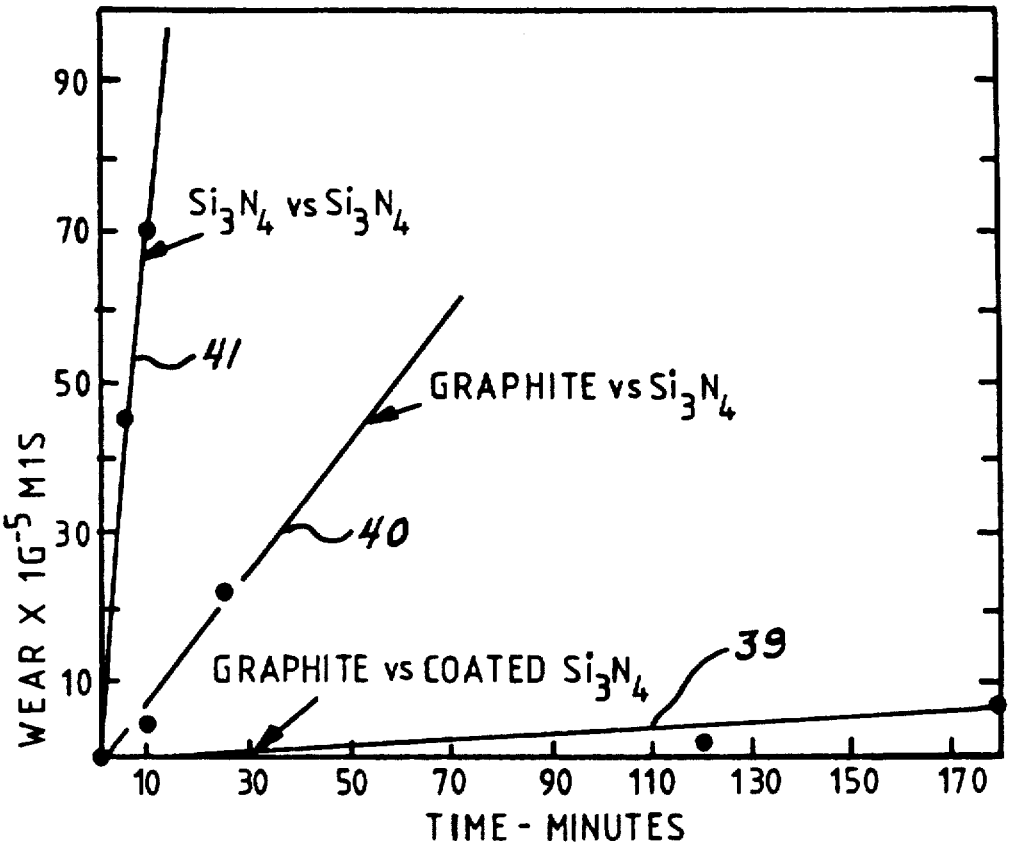
FIG. 8 is a graphical illustration of time plotted against wear for the various combinations of materials used in FIG. 7.
Figure 9:
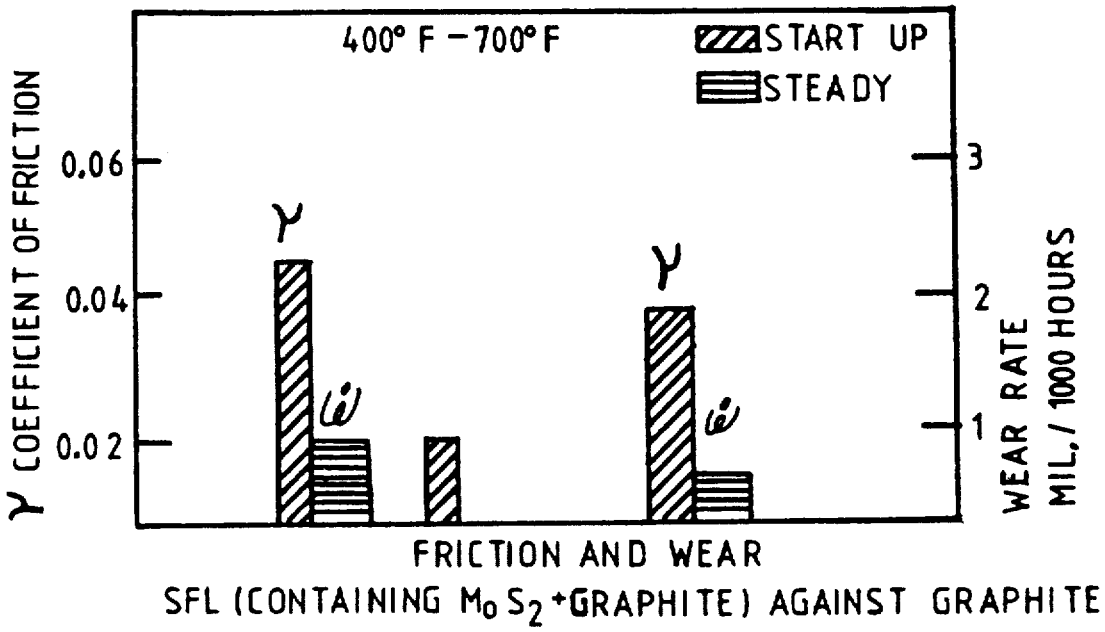
FIG. 9 is a graphical illustration of friction and wear under different conditions for a solid film lubricant coating of this invention against graphite.

This polymer based coating mixture will have a coefficient of friction which is ½ to ⅓ that of the metal matrix graphite-carrying composite of body 20. In FIGS. 7, 8 and 9, a test using such coating against $Si_3N_4$ was compared to uncoated $Si_3N_4$ or graphite on $Si_3N_4$. FIG. 7 shows a plot 36 for coefficient of friction for a coated silicon nitride cylinder wall against which a graphite body is rubbed thereagainst; it had the lowest overall coefficient of friction compared to plots 37 for uncoated silicon nitride against silicon nitride and plot 38 for a graphite body against silicon nitride. Similarly in FIG. 8, a plot of wear 39 for coated silicon nitride against a graphite body had a value quantity considerably less than that of the other materials (see plots 40 and 41). As shown in FIG. 9, when a graphite body is rubbed against a coating of solid film lubricant containing molybdenum disulfide and graphite, the friction and wear therebetween was extremely low both in the start-up and steady-state conditions for an engine.

BN will break down as a structural solid at about 750° F. and $MoS_2$ will do so at about 600° F. To permit such substances to continue providing antifriction characteristics after such breakdown, the supporting surface may be provided with reservoirs 43 or grooves to capture or retain the solid film lubricant coating 44, much in the manner of porosity. These reservoirs may be grooves in the cylinder wall, which grooves are vertically oriented, spaced apart a distance of about 3 mm, and each may have a semicircular depth of about 0.003 inches.

Figure 10:
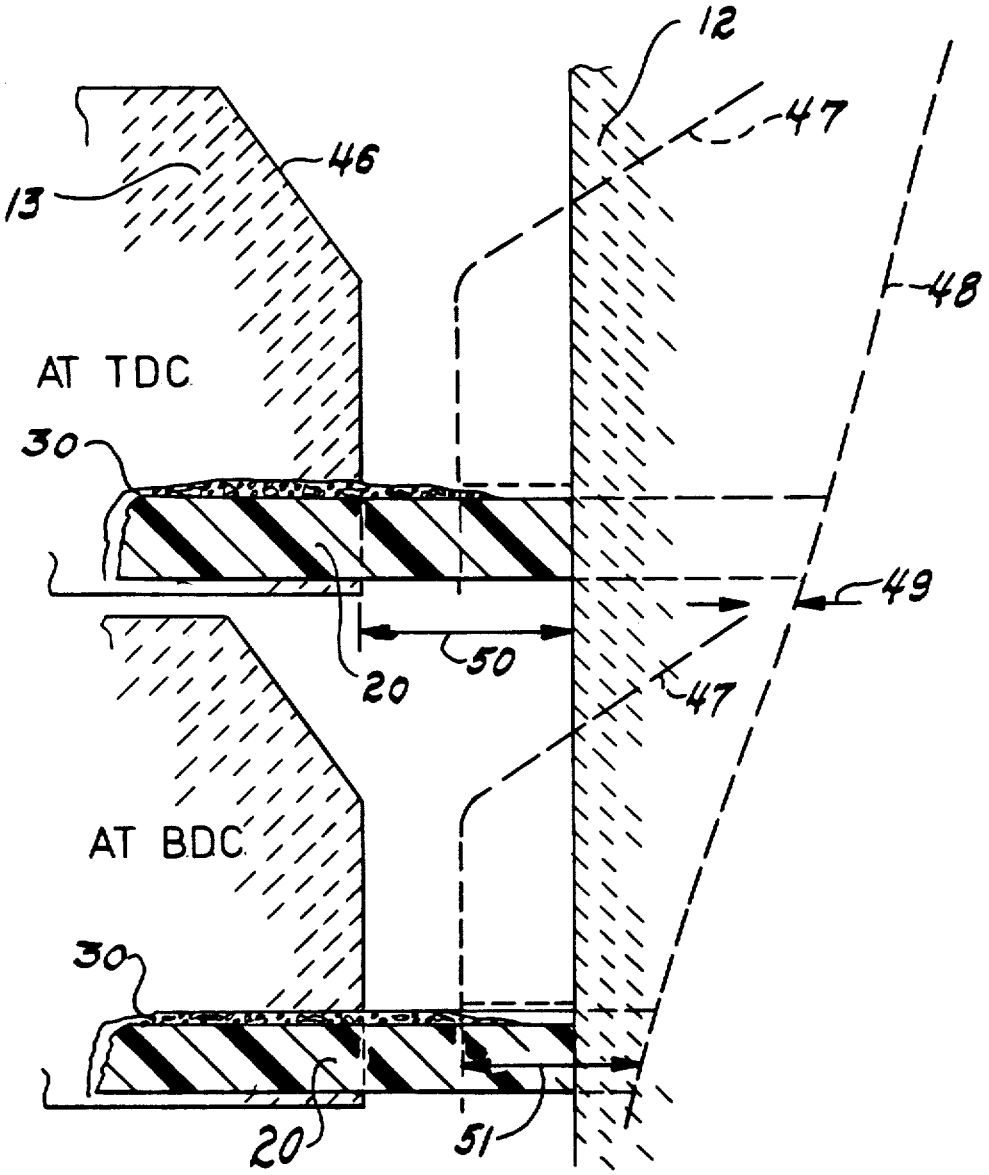
FIG. 10 is an enlarged schematic view of the piston and cylinder and gas phase control of FIG. 3 at top dead center and bottom dead center, both in the cold and the hot operating conditions.

In operation, and as shown in FIG. 10, the gas phase control of this first embodiment functions to close the gap (shown as 0.06 mm) with cylinder 12 both at top dead center and bottom dead center for the piston 13 when the engine is cold (ambient conditions). This is illustrated in solid full line. The piston is illustrated with an exaggerated chamfer 46 and a piston diameter of about 80 mm. The chamfer increases the gap at the piston shoulder to 0.10 mm. The chamfer is needed to compensate for the mushrooming effect (see broken line 47 of the hot piston) that takes place at the crown of the piston due to exposure to the highest temperatures and thus the highest thermal growth. The cylinder wall 12 will also undergo a gradient of thermal growth with the greatest change in dimension at the top of the cylinder wall (see broken line 48 for the hot cylinder wall). Please note that if the piston top was not chamfered, its hot size would interfere with the cylinder wall during the bottom dead center position. With the chamfer the hot size of the piston crown will always stay separated (at 49). Thus, the control body 20 must only accommodate a change in gap from a radial distance of 50 when cold to a radial distance of 51 when the parts are hot, which may be a very slight change or may be very large, depending on design.

Embodiment Two

Figure 11:
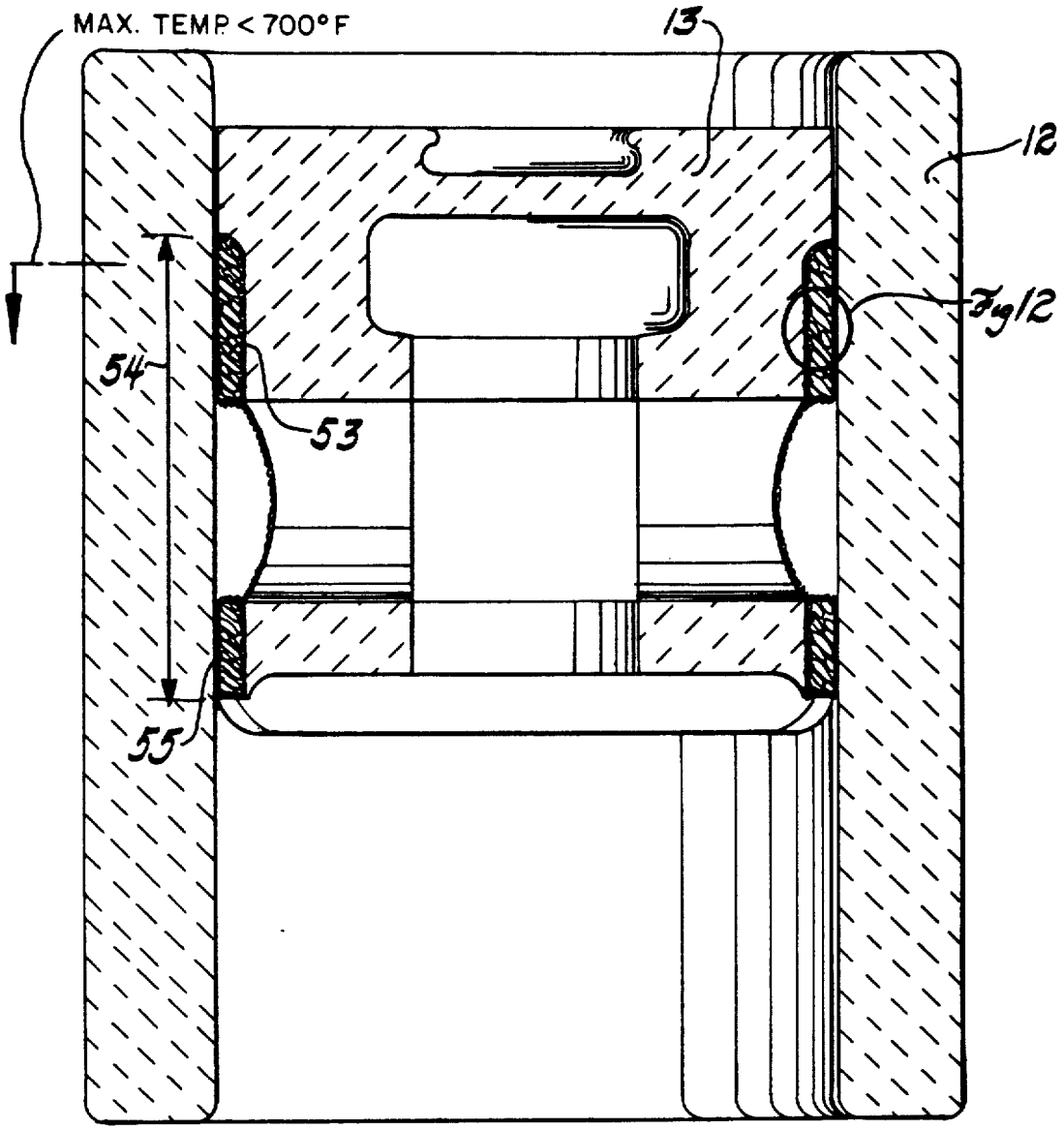
FIG. 11 is an enlarged central sectional view of a piston and cylinder representing a second embodiment of this invention.
Figure 12:
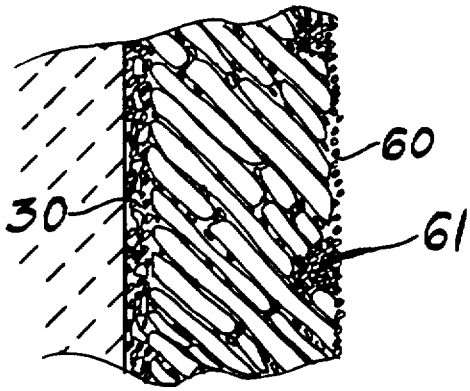
FIG. 12 is an enlarged sectional view taken substantially along a vertical radial plane of FIG. 5.

As shown in FIG. 11, an alternative embodiment incorporates a similar control body, but the modified annular body 53 is expanded to have an axial extent 54 from the bottom of the piston side wall to above the piston pin area, approximately three-quarters of the way up the side wall of the piston. Such control body forms a sleeve which will be exposed to a higher maximum operating temperature, as high as 880° F. To insure that the solid lubricant body has a sufficiently low friction at such higher operating temperatures, the face of the body is coated with a solid film lubricant containing $MoS_2$ or BN and graphite as described earlier. Moreover, the cylinder wall 12 should contain a coating 60 of such polymer/molybdenum disulfide/graphite mixture. Both coatings, on body face 55 and on the cylinder wall 12, should contain reservoir grooves 61 in the supporting substrate to assist in distributing the material at higher temperatures, as shown in FIG. 12. The grooves on the cylinder wall may be vertically oriented, spaced apart about a distance of 3 mm, while the grooves on the face of the solid lubricant body may be horizontal spiral grooves oriented to across the grooves in the cylinder wall during piston reciprocation and promote a mutual distribution of the solid film lubricant particularly at higher temperatures. This embodiment is best suited to an articulated piston where the piston crown is made separately from the piston skirt; it works well in either a four or two stroke engine.

Figure 13:
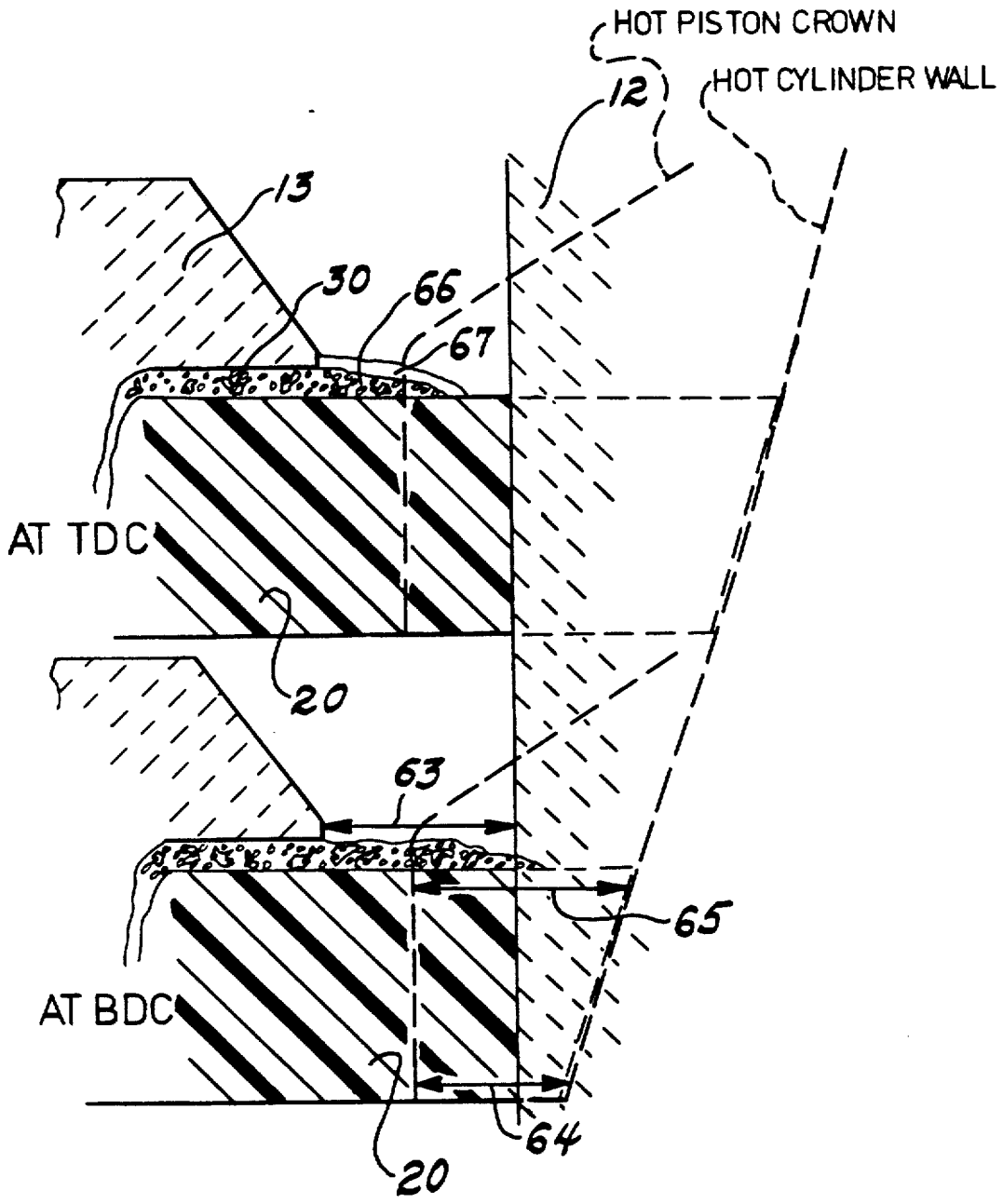
FIG. 13 is a schematic view of the piston and cylinder arrangement of FIG. 11 showing the change in thermal expansion of such components from hot to cold.

FIG. 13 illustrates how the sleeve type gas phase control will function. The body 20 is exaggerated to show how it extends up a more significant distance of the piston side wall. Elastomer material 30 is exposed to temperatures in excess of 700° F. at the top of the body and thus a refractory coating 67 may be deposited on the elastomer at such exposed areas 66. The body 20 must accommodate a wider fluctuation in the gap from cold to hot (i.e., from cold radial distance 63 to hot radial distance 64 and 65).

Embodiment Three

Figure 14:
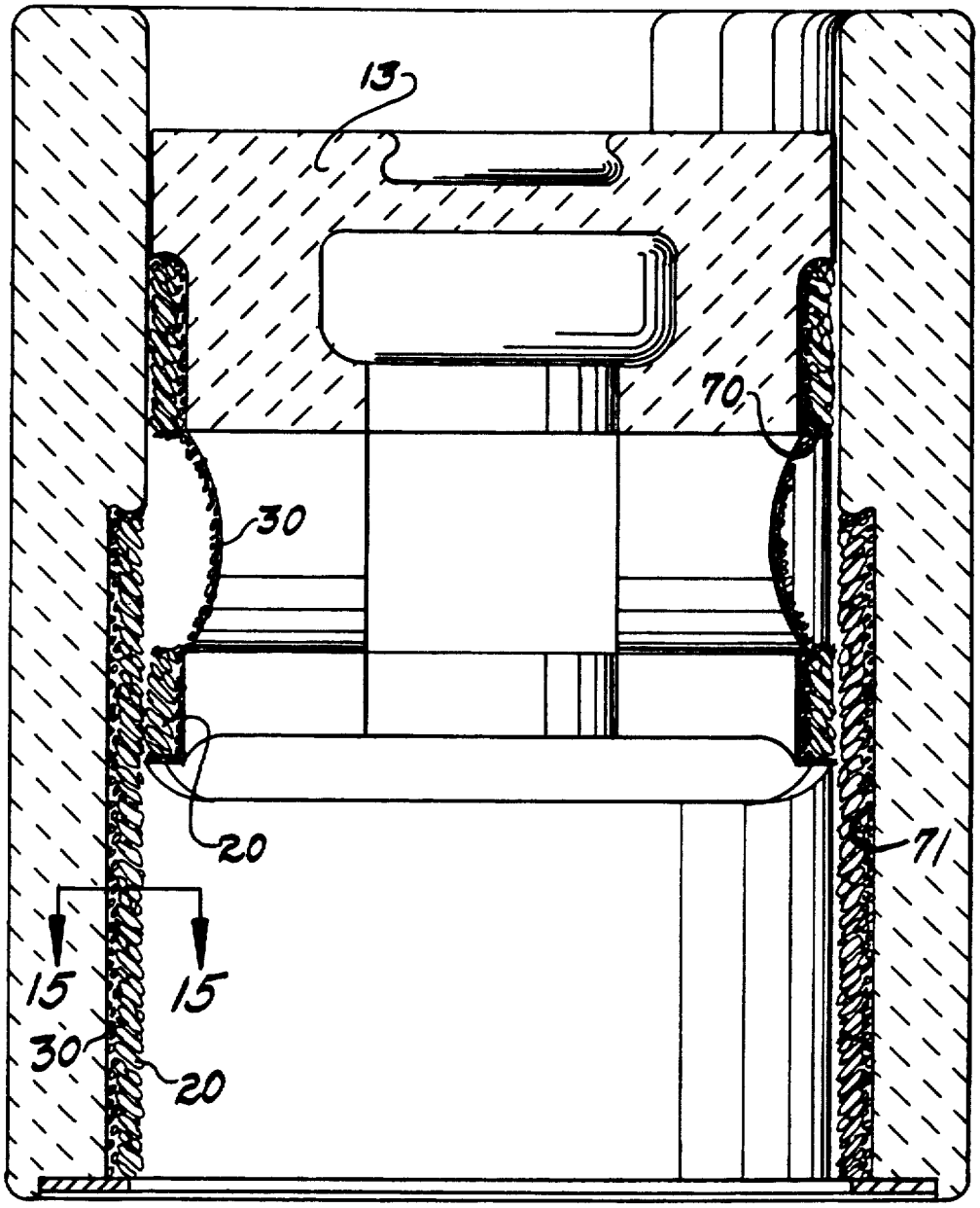
FIG. 14 is an enlarged central sectional view of still a third embodiment of this invention.
Figure 15:
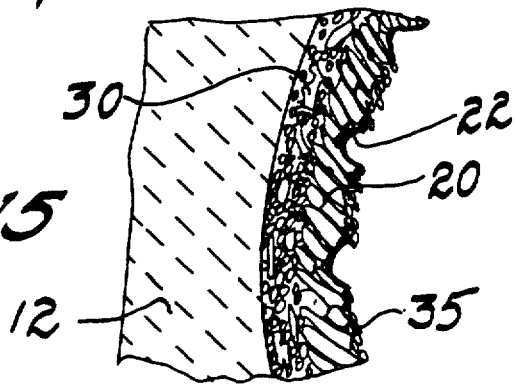
FIG. 15 is an enlarged sectional view taken substantially along line 15—15 of FIG. 17.

The embodiment illustrated in FIGS. 14 and 15 provides for the control body to be in a receptacle disposed at 70, not only in the piston, but also at 71 on the cylinder wall. The control bodies each will have elastomers urging the two bodies together to close the gap between the piston and cylinder wall. One or the other of the mating control bodies may have blow-by grooves or both may have blow-by grooves. It is possible that the elastomer may be eliminated from the piston in this embodiment. This is useful because the cylinder wall runs considerably cooler than certain regions of the piston wall and such cylinder wall will be better able to protect the elastomer.

Embodiment Four

Figure 16:
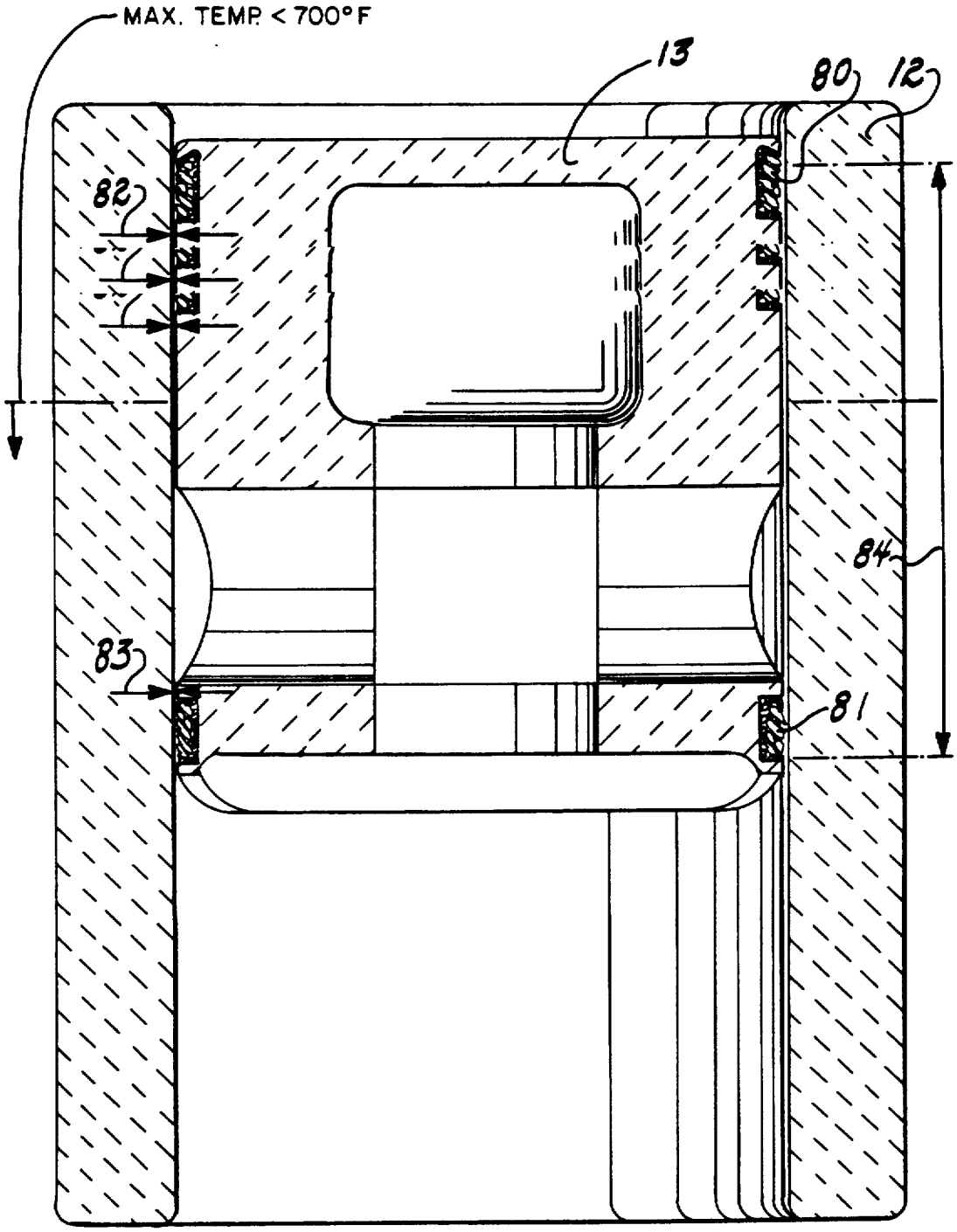
FIG. 16 is an enlarged central sectional view of a fourth embodiment of this invention.

FIG. 16 illustrates still another embodiment which employs shallow ring bodies 80 and 81, one adjacent the top of the piston and another adjacent the bottom of the piston side wall. Each annular body 80 and 81 employs the same type of elastomer and graphite-carrying solid lubricant body, as described in Embodiment One, to close the gaps 82 and 83 at the top and bottom of the piston, respectively. The net effect of separated bodies is to trap a gas film therebetween (across extent 84) to more effectively operate as a squeeze film and thereby insure antifriction characteristics therebetween. Both of the shallow control bodies will have axially directed blow-by grooves to facilitate the provision of rolling gas phase cylinders acting as bearings. This embodiment is particularly helpful in a four-stroke engine where any gas phase squeeze film may be particularly thin during the intake and exhaust strokes. This trapping of the gas phase between the annular control bodies facilitates the maintenance of such film during such strokes.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

We claim:

1. In an oilless engine having a piston reciprocal within a cylinder and along an axis of such cylinder while providing an annular gap therebetween to receive combustion gases, a gas phase blow-by control system comprising:

(a) an annular receptacle in at least one of said piston and cylinder;

(b) an annular body of graphite carrying high temperatures solid lubricant disposed in said annular receptacle, said body presenting a face projecting out of said receptacle;

(c) an elastomer material retentive of elasticity at the maximum operating temperature to be experienced by said body, interposed between said body and receptacle to urge said body to close said gap under all operating conditions of said engine; and (d) axially directed grooves in said body face sized to substantially trap cylinders of combustion gases therein by viscosity under low pressure gradients and to limit the passage of a combustion gases through said grooves under high pressure gradients to one percent or less of the cylinder gas flow charge volume, the gas cylinders functioning as bearings to ride the piston during reciprocation and provide predominantly gas-phase, lubrication.

2. The system as in claim 1, in which a coating of solid film lubricant is disposed on the other of said piston or cylinder not selected for said receptacle in step (a).

3. The system as in claim 1, in which a solid film lubricant coating is placed on the face of said annular body, said coating having a coefficient of friction at high temperatures of less than the coefficient of friction of said body.

4. The system as in claim 1, in which said gap is in the range of 0.0002–0.04 inches.

5. The system as in claim 2 or 3, in which said coating is comprised of a polymer based molybdenum disulfide and graphite mixture.

6. The system as in claim 1, in which said elastomer is comprised of silanes compounded with glass fibers, zinc oxide and carbon black and processed to provide a resilient high temperature resisting material.

7. The system as in claim 1, in which said piston has a cylindrical side wall interrupted by a transversely extending piston pin, the axial extent of said receptacle and body extends from adjacent the bottom of said piston side wall to adjacent the bottom of said piston pin.

8. The system as in claim 7, in which said body is comprised of a material that maintains its antifriction characteristics up to a temperature of 550° F. or less.

9. The system us as in claim 1, in which said grooves make an angle with respect to said cylinder axis of 2°–15°.

10. The system as in claim 1, in which said piston has a crown and a side wall interrupted by a transversely extending piston pin, and in which said annular receptacle and body have a axial extent proceeding from the bottom of said piston side wall to above the piston pin but below the crown of said piston.

11. The system as in claim 10, in which the material for said annular body is selected to retain antifriction characteristics up to 880° F.

12. The system as in claim 1, in which receptacles are provided in both said piston side wall and cylinder wall for receiving an independent annular body and elastomer therein.

13. The system as in claim 1, in which a receptacle and body is provided at each of two separated locations, one adjacent the top of the piston and another adjacent the bottom of the piston.

14. A gas phase lubricating system for an internal combustion engine piston-cylinder arrangement substantially devoid of liquids, comprising:

(a) a dry lubricant ring, mounted around said piston;

(b) means for mechanically resiliently biasing said dry lubrication ring, toward engagement with said cylinder; and (c) grooves in either or both of said cylinder or ring to form small cylinders of gases attempting to migrate between said piston and cylinder, and which gas phase small cylinders function to separate and lubricate the relative movement between said cylinder and piston.

15. The lubricating system as in claim 14, in which said grooves are generally axially directed with respect to the axis of said piston and cylinder, but make an angle with respect to the cylinder axis of about 2°–15°.

16. The lubrication system as in claim 14, in which said grooves have a depth of 0.003–0.01 inches.

17. The lubrication system as in claim 14, in which the total cross-sectional volume of all of the grooves together provide blow-by of said gases under a high pressure gradient that is limited to one percent or less of the gas charge volume attempting to migrate between said piston and cylinder.

*18. A fluid lubricating system for a piston-cylinder arrangement, comprising:*

*(a) a dry lubricant ring mounted around said piston;*

*(b) means for mechanically resiliently biasing said dry lubrication ring toward engagement with said cylinder; and*

*(c) grooves in either or both of said cylinder or ring to form small cylinders of fluid attempting to migrate between said piston and cylinder, and which fluid small cylinders function to separate and lubricate the relative movement between said cylinder and piston.*

*19. A machine having a piston and cylinder reciprocating relative to one another while providing an annular gap therebetween to receive pressurized gases, a gas phase blow-by control system comprising:*

*(a) an annular receptacle in at least one of said piston and cylinder;*

*(b) an annular body of graphite carrying high temperature solid lubricant disposed in said annular receptacle, said body presenting a face projecting out of said receptacle;*

*(c) an elastomer material retentive of elasticity at the maximum operating temperature to be experienced by said body, interposed between said body and receptacle to urge said body to close said gap under all operating conditions of said engine; and*

*(d) axially directed grooves in said body face sized to substantially trap cylinders of pressurized gases therein by viscosity under low pressure gradients and to limit the passage of pressurized gases through said grooves, the gas cylinders functioning as bearings to ride the piston during reciprocation and provide predominantly gas-phase lubrication.*

*20. A gas phase lubricating system for a reciprocating piston-cylinder arrangement substantially devoid of liquids, comprising:*

*(a) a dry lubricant ring mounted around said piston;*

*(b) means for mechanically resiliently biasing said dry lubrication ring toward engagement with said cylinder; and*

*(c) grooves in either or both of said cylinder or ring to form small cylinders of gases attempting to migrate between said piston and cylinder, and which gas phase small cylinders function to separate and lubricate the relative movement between said cylinder and piston.*

* * * * *